(No Model.)

W. M. PATT.
MACHINE FOR ORNAMENTING WIRE.

No. 415,880. Patented Nov. 26, 1889.

WITNESSES:
Chas. H. Luther Jr
M. F. Bligh

INVENTOR:
William M. Patt.
by Joseph A. Miller & Co.
Attys

UNITED STATES PATENT OFFICE.

WILLIAM M. PATT, OF PROVIDENCE, RHODE ISLAND.

MACHINE FOR ORNAMENTING WIRE.

SPECIFICATION forming part of Letters Patent No. 415,880, dated November 26, 1889.

Application filed June 10, 1889. Serial No. 313,650. (No model.)

*To all whom it may concern:*

Be it known that I, WILLIAM M. PATT, of the city and county of Providence and State of Rhode Island, have invented a new and useful Improvement in Machines for Ornamenting Wire; and I hereby declare that the following is a full, clear, and exact description of the same, reference being had to the accompanying drawings, forming part of this specification.

This invention refers to an improvement in the class of milling-machines used for ornamenting wire and tubes for jewelers' use; and it consists in an adjustable milling-wheel supported in suitable slides connected with a rotating tubular arbor, so that in rotating around the wire or tube ornamentations may be formed spirally around the same, as will be more fully set forth hereinafter.

Figure 1:
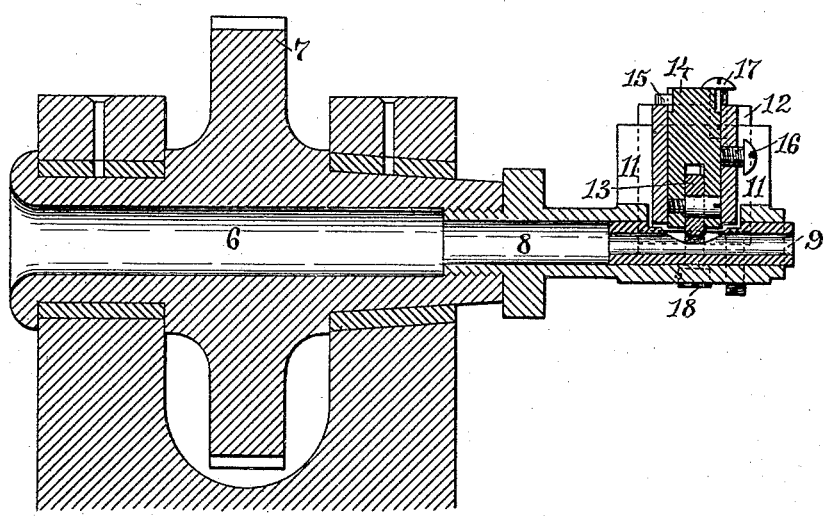
Figure 2:
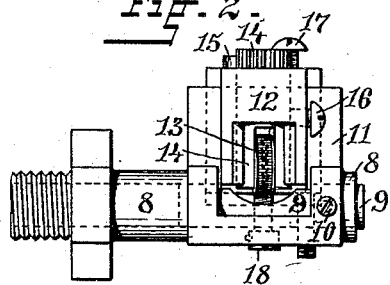
Figure 3:
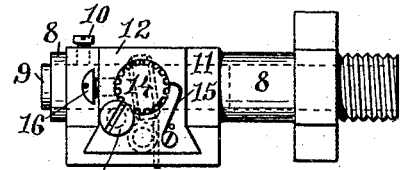
Figure 4:
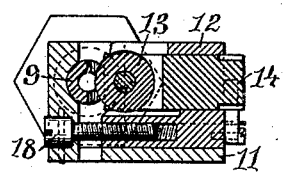
Figure 5:

Figure 1 is a sectional view through the center of the arbor and the milling device. Fig. 2 is a view of the improved milling device, showing the adjustable slide in which the milling-wheel is supported. Fig. 3 is a side view of the milling device. Fig. 4 is a sectional view through the center of the slide and milling-wheel. Fig. 5 is a view of a piece of ornamented wire or tube.

Similar numbers of reference indicate corresponding parts in all the figures.

The number 6 indicates a tubular arbor provided with the gear-wheel 7 or other means for turning the same. The arbor is supported in suitable bearings, as is shown in Fig. 1. One end of the arbor 6 is screw-threaded, and to it is secured the tube 8, so as to rotate with the same. The tube 9 is secured in the tube 8 by the clamp-screw 10. A portion of the tubes 8 and 9 is cut away, as is shown in Fig. 2. The bed 11 is formed in one piece with the tube 8. The slide 12 is firmly supported in suitable ways in the bed 11. The die or milling wheel 13 is journaled in the end of the cylindrical shaft 14. The opposite end of the shaft 14 is provided with notches into which the spring-pawl 15 enters. The shaft 14, and with it the die or milling wheel 13, can be turned so as to set the milling-wheel at any desired angle to the axis of the tube 9, and is secured in the required position by the clamp-screw 16. The screw 17 forms a thrust, the head bearing against the end of the shaft 14, the screw being threaded in the slide 12.

The adjustment of the die or milling wheel to the wire is effected by means of the screw 18, the head of which is provided with a groove and held by a key, as is shown in Fig. 4.

The operation of the machine is as follows: A solid or tubular wire to be ornamented is placed into the tube 9. The shaft 14, with the die or milling wheel, is adjusted so that the milling-wheel will be at such an angle to the wire as will secure the desired spiral impression on the surface of the wire. Rotary motion is now imparted to the arbor and the milling device. The wire is held against rotation. The die or milling wheel rotating around the wire in a spiral draws the wire through the mandrel while impressing the ornamentation on the surface of the wire. By means of the screw 18 the slide 12 is readily adjusted, so that the die or milling wheel can be made to bear against the wire, so as to impress on the same the pattern engraved on the die or milling wheel.

If wire or tubes of larger diameter than the interior of the tubes 9 are to be ornamented, the tube 9 is removed and the tube or wire passed through the tube 8.

Having thus described my invention, I claim as new and desire to secure by Letters Patent—

1. A machine for ornamenting wire, consisting in a rotating tubular arbor supported in suitable bearings, a bed provided with ways extending from the arbor at right angle to its axis and revolving with the same, a slide adjustable on the bed, and a shaft supporting a milling-wheel held adjustably in the slide, so that the milling-wheel can be fixed at any desired angle to the axis of the tubular arbor in the combination, as described.

2. In a machine for ornamenting cylindrical surfaces, the combination, with a tubular arbor constructed to be rotated, of a slide constructed to rotate with the arbor and adjustable to and from the center of the arbor, and a cylindrical shaft secured in the slide provided with a die or milling wheel, as and for the purpose described.

3. The combination, in a machine for ornamenting wire, with the tubular arbor 6, supported in suitable bearings and the tube 8, of the bed 11, secured to or forming part of the tube 8, the slide 12, the shaft 14 and embossing-wheel 13, the pawl 15, the adjusting-screw 18, and clamp-screw 16, as described.

4. The combination, in a machine for ornamenting wire, with the tubular arbor 6, supported in suitable bearings, and the tube 8, of the bed 11, provided with ways, the slide 12, adjustably secured on the bed 11, the shaft 14 and embossing-wheel 13, the clamp-screw 16, the adjusting-screw 18, and the tube 9, as described.

WILLIAM M. PATT.

Witnesses:
JOSEPH A. MILLER,
J. A. MILLER, Jr.